US007901287B2

(12) United States Patent
Simms et al.

(10) Patent No.: US 7,901,287 B2
(45) Date of Patent: Mar. 8, 2011

(54) GAMING DEVICE HAVING OFFER AND ACCEPTANCE GAME WITH A PLURALITY OF AWARD POOLS, A REVEAL FEATURE, AND A MODIFY FEATURE

(75) Inventors: Richard J. Simms, Henderson, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 1290 days.

(21) Appl. No.: 10/255,862

(22) Filed: Sep. 26, 2002

(65) Prior Publication Data

US 2003/0078093 A1 Apr. 24, 2003

Related U.S. Application Data

(60) Provisional application No. 60/325,706, filed on Sep. 28, 2001.

(51) Int. Cl.
*A63F 13/00* (2006.01)

(52) U.S. Cl. ............................................ 463/26; 463/16

(58) Field of Classification Search ................. 463/1-69
See application file for complete search history.

(56) References Cited

U.S. PATENT DOCUMENTS 3,048,402 A 8/1962 Schaper
4,327,919 A 5/1982 Vennor
4,448,419 A 5/1984 Telnaes
4,488,727 A 12/1984 Lam
4,573,681 A * 3/1986 Okada ............................ 463/21
4,582,324 A 4/1986 Koza et al.
4,624,459 A 11/1986 Kaufman
4,695,053 A 9/1987 Vazquez, Jr. et al.
4,991,848 A 2/1991 Greenwood et al.

(Continued)

FOREIGN PATENT DOCUMENTS

EP 0874337 A1 10/1998

(Continued)

OTHER PUBLICATIONS

Addams Family Advertisement and Article written by IGT, Strictly Slots, published in 2000.

(Continued)

*Primary Examiner* — Scott Jones
(74) *Attorney, Agent, or Firm* — K&L Gates LLP

(57) ABSTRACT

A gaming device having an offer and acceptance game with a plurality of award pools, a reveal feature and a modify feature. When the game is initiated, the gaming device randomly selects a pre-determined pool of awards from a plurality of pre-determined pools of awards which each includes a pre-determined initial award or offer. The awards included in the selected pool of awards are displayed to the player. The gaming device randomly associates the plurality of awards from the selected pre-determined pool of awards with a plurality of selectable selections. The gaming device enables the player to either accept the initial award or select one of the selections. If the player accepts the initial award, the player obtains the initial award and the game ends. If the player selects one of the selections, the gaming device reveals the alternate award associated with the player selected selection, the player obtains the revealed alternate award and the game ends. In one embodiment, after the player has obtained or accepted an award, the gaming device provides the player an opportunity to modify or increase the obtained award by selecting a masked choice which is associated with a modifier.

28 Claims, 13 Drawing Sheets

U.S. PATENT DOCUMENTS 5,034,807 A 7/1991 Von Kohorn
5,046,737 A * 9/1991 Fienberg ....................... 273/139
5,178,390 A 1/1993 Okada
5,205,555 A 4/1993 Hamano
5,259,616 A 11/1993 Bergman
5,342,047 A 8/1994 Heidel et al.
5,456,465 A 10/1995 Durham
5,511,781 A * 4/1996 Wood et al. ..................... 463/13
5,524,888 A 6/1996 Heidel
5,536,016 A 7/1996 Thompson
5,542,669 A 8/1996 Charron et al.
5,560,603 A 10/1996 Seelig et al.
5,611,535 A 3/1997 Tiberio
5,711,525 A 1/1998 Breeding
5,769,716 A 6/1998 Saffari et al.
5,772,509 A 6/1998 Weiss
5,775,692 A 7/1998 Watts et al.
5,788,573 A 8/1998 Baerlocher et al.
5,833,538 A 11/1998 Weiss
5,848,932 A * 12/1998 Adams ............................ 463/20
5,851,148 A 12/1998 Brune et al.
5,873,781 A 2/1999 Keane
5,882,261 A 3/1999 Adams
5,890,962 A 4/1999 Takemoto
5,902,184 A 5/1999 Bennett et al.
5,911,418 A 6/1999 Adams
5,944,314 A 8/1999 Stavinsky
5,947,820 A 9/1999 Morro et al.
5,951,397 A 9/1999 Dickinson
5,964,463 A 10/1999 Moore, Jr.
5,967,894 A 10/1999 Kinoshita et al.
5,980,384 A 11/1999 Barrie
5,984,781 A 11/1999 Sunaga
5,997,400 A 12/1999 Seelig et al.
5,997,401 A 12/1999 Crawford
6,004,207 A 12/1999 Wilson, Jr. et al.
6,015,346 A 1/2000 Bennett
6,019,369 A 2/2000 Nakagawa et al.
6,033,307 A 3/2000 Vancura
6,056,642 A 5/2000 Bennett
6,059,289 A 5/2000 Vancura
6,059,658 A 5/2000 Mangano et al.
6,062,980 A 5/2000 Luciano
6,068,553 A 5/2000 Parker
6,089,976 A 7/2000 Schneider et al.
6,089,977 A 7/2000 Bennett
6,089,978 A 7/2000 Adams
6,093,102 A 7/2000 Bennett
6,102,798 A 8/2000 Bennett
6,117,009 A * 9/2000 Yoseloff .......................... 463/20
6,120,031 A 9/2000 Adams
6,126,541 A 10/2000 Fuchs
6,126,542 A 10/2000 Fier
6,142,873 A * 11/2000 Weiss et al. ..................... 463/20
6,142,874 A 11/2000 Kodachi et al.
6,142,875 A 11/2000 Kodachi et al.
6,146,273 A 11/2000 Olsen
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,168,520 B1 1/2001 Baerlocher et al.
6,168,523 B1 1/2001 Piechowiak et al.
6,173,955 B1 1/2001 Perrie et al.
6,174,233 B1 1/2001 Sunaga et al.
6,174,235 B1 1/2001 Walker et al.
6,190,254 B1 2/2001 Bennett
6,190,255 B1 2/2001 Thomas et al.
6,203,429 B1 3/2001 Demar et al.
6,210,279 B1 4/2001 Dickinson
6,213,876 B1 4/2001 Moore, Jr.
6,224,483 B1 5/2001 Mayeroff
6,231,442 B1 5/2001 Mayeroff
6,231,445 B1 5/2001 Acres
6,261,177 B1 7/2001 Bennett
6,302,790 B1 10/2001 Brossard
6,305,686 B1 10/2001 Perrie et al.
6,309,300 B1 10/2001 Glavich
6,328,649 B1 12/2001 Randall et al.
6,375,187 B1 4/2002 Baerlocher
D457,571 S 5/2002 Edwards, Jr.
6,398,218 B1 6/2002 Vancura
6,406,369 B1 6/2002 Baerlocher et al.
6,413,160 B1 7/2002 Vancura
6,425,824 B1 7/2002 Baerlocher et al.
6,435,511 B1 8/2002 Vancura et al.
6,494,785 B1 12/2002 Gerrard et al.
6,506,118 B1 1/2003 Baerlocher et al.
6,514,141 B1 2/2003 Kaminkow et al.
6,569,015 B1 5/2003 Baerlocher et al.
6,599,192 B1 7/2003 Baerlocher et al.
6,632,141 B2 10/2003 Webb et al.
6,648,754 B2 11/2003 Baerlocher et al.
6,659,864 B2 12/2003 McGahn et al.
6,692,355 B2 2/2004 Baerlocher et al.
6,719,632 B2 4/2004 Palmer et al.
6,722,981 B2 4/2004 Kaminkow et al.
6,722,982 B2 4/2004 Kaminkow et al.
6,758,750 B2 7/2004 Baerlocher et al.
6,776,711 B1 8/2004 Baerlocher
6,780,110 B2 8/2004 Baerlocher et al.
6,786,820 B2 9/2004 Gerrard et al.
6,793,579 B2 9/2004 Baerlocher et al.
6,796,905 B2 9/2004 Baerlocher et al.
6,808,452 B2 10/2004 Baerlocher et al.
6,808,454 B2 10/2004 Gerrard et al.
6,811,483 B1 11/2004 Webb et al.
6,852,030 B2 2/2005 Baerlocher et al.
6,890,257 B2 5/2005 Baerlocher
6,899,623 B2 5/2005 Baerlocher
6,942,566 B2 9/2005 Baerlocher et al.
6,942,567 B2 9/2005 Baerlocher et al.
6,960,132 B2 11/2005 Baerlocher et al.
6,966,833 B2 11/2005 Kaminkow et al.
6,971,953 B2 12/2005 Gerrard et al.
7,001,273 B2 2/2006 Baerlocher
7,037,192 B2 5/2006 Baerlocher et al.
7,160,190 B2 1/2007 Baerlocher et al.
7,192,344 B2 3/2007 Baerlocher
7,192,349 B2 3/2007 Baerlocher et al.
7,201,657 B2 4/2007 Baerlocher et al.
7,235,009 B2 6/2007 Baerlocher
7,235,010 B2 6/2007 Baerlocher
7,238,109 B2 7/2007 McGahn et al.
7,250,001 B2 7/2007 Baerlocher et al.
7,331,865 B2 2/2008 Baerlocher et al.
2003/0040360 A1 2/2003 Kaminkow
2003/0045350 A1 3/2003 Baerlocher et al.
2003/0162584 A1 8/2003 Hughs-Baird et al.
2004/0023707 A1 2/2004 Maya et al.
2004/0038729 A1 2/2004 Webb et al.
2004/0116174 A1 6/2004 Baerlocher et al.
2004/0162128 A1 8/2004 Baerlocher et al.
2004/0180710 A1 9/2004 Palmer et al.
2004/0185928 A1 9/2004 Baerlocher et al.
2004/0214632 A1 10/2004 Cuddy et al.
2005/0020346 A1 1/2005 Baerlocher
2005/0032567 A1 2/2005 Baerlocher et al.
2005/0037829 A1 2/2005 Baerlocher et al.
2005/0101375 A1 5/2005 Webb et al.
2005/0130729 A1 6/2005 Baerlocher et al.
2005/0187010 A1 8/2005 Baerlocher
2005/0266914 A1 12/2005 Baerlocher et al.
2006/0003837 A1 1/2006 Baerlocher et al.
2007/0149270 A1 6/2007 Baerlocher et al.

FOREIGN PATENT DOCUMENTS

EP 0926645 A2 6/1999
EP 0944030 A2 9/1999
EP 0945837 A2 9/1999
EP 0981119 A2 2/2000
EP 0984408 A2 3/2000
EP 0984409 A2 3/2000
GB 2 262 642 6/1993
JP 07185126 7/1995
JP 08155134 A 6/1996

| | | | |
|---|---|---|---|
| JP | 10048363 A | 2/1998 |
| JP | 200014933 | 1/2000 |
| JP | KR 2001066723 A | 1/2000 |
| JP | 2000245949 A | 9/2000 |
| JP | 2000254350 A | 9/2000 |
| WO | WO 9732285 | 9/1997 |
| WO | WO 00/12186 | 3/2000 |

OTHER PUBLICATIONS

Adders and Ladders Advertisement written by Barcrest Ltd., published prior to 2000.
American Thunder Screen Shots written by IGT, published in 1998.
Big Bang Piggy Bankin Advertisement written by WMS Gaming, Inc., published prior to 2000.
Blackjack/Twenty-One Description written by Hoyle's Rules of Games, published in 1993.
Bonus Spin Red, White & Blue Advertisement written by IGT, published in 2000.
Bonus Times Article written by Strictly Slots, published in 2000.
By George written by IGT, published in 2002.
Caribbean Gold II Advertisement written by Aristocrat Incorporated, published in 1998.
Cash Box Advertisement & Article written by Anchor Games, Strictly Slots, published in 2000.
Chutes & Ladders Game Instructions written by Hasbro-Milton Bradley, published in 1999.
Description of Let's Make a Deal Television Show written by letsmakeadeal.com (2 pages), printed on Mar. 16, 2001.
Double Diamond Game Descriptions written by IGT printed on Mar. 21, 2001.
Double Up Poker Game Description written by IGT Undated.
Easy Street Advertisements and Articles written by Casino Data Systems, published in 2000.
Elvis Advertisement written by IGT, published in 1999.
Empire Game Advertisement written by AC Coin, published in 1996.
Fire and Fortune Article written by Strictly Slots, published in 2001.
Fox "N" Hound Advertisement written by IGT, published in 2000.
In Between Game Description written by IGT, available prior to 2000.
Jackpot Party Advertisements and Articles written by WMS Gaming, Inc., published in 1998.
Keep Your Hat on Advertisement written by Aristocrat, published in 2001.
Let's Make a Deal written by geocities.com (10 pages), printed on Mar. 21, 2001.
Let's Make a Deal written by fortunecity.com (4 pages), printed on Mar. 21, 2001.
Let's Make a Deal written by Illinoislottery.com (1 page), printed on Mar. 21, 2001.
Let's Make a Deal geocities.com (2 pages), printed on Mar. 16, 2001.
Let's Make A Deal Advertisement written by Shuffle Master and IGT, published in 2001.
Let's Make a Deal Game Advertisement written by Bally Gaming Systems, published in 1999.
Little Green Men Advertisement and Article written by IGT, Strictly Slots, published in 2000.
MegaJackpots Advertisement written by IGT, published in 1998.
Money Grab Article written by Strictly Slots, published in Apr. 2001.
Money in the Bank Advertisement written by Strictly Slots Konami, published in 2001.
Monopoly Advertisements and Articles written by WMS Gaming, Inc., Strictly Slots, published in 1998, 1999, 2000.
Monopoly Party Train Article written by Strictly Slots, published in 2002.
Neon Nights written by IGT, published in 2000.
On the Money Article written by Strictly Slots, Casino Data Systems, published in Dec. 2000.
Polly & Roger Advertisement written by VLC, Inc., published in 2000.
Price is Right "Cliff Hangers" Description written by www.geocities.com; members.aol.com (web site), printed Mar. 21, 2001.
Price is Right "Showcases" Description written by schuminweb.com (web site), printed Mar. 16, 2001.
Psycho Cash Beast Club (including knockouts) written by Barcrest, published prior to 1998.
Richard Petty Advertisement written by IGT, published in 2000.
South Park—Dodgeball Advertisement written by IGT, published in 2000.
Spell Binder Advertisement written by IGT, published in 2000.
Sphinx Advertisement written by Atronic Casino Technology, Ltd., published in 1997.
Take Your Pick Article written by Strictly Slots, published in Mar. 2001.
Take Your Pick Advertisement written by IGT/Anchor Gaming, published in 1999.
Texas Tea Advertisement written by IGT, published in 2000.
The Deals of Let's Make a Deal written by fortunecity.com (2 pages), printed on Mar. 16, 2001.
The Official Let's Make a Deal Website written by Bally Gaming System Website, printed on Mar. 16, 2001.
Top Cat Advertisement written by WMS Gaming, Inc., published prior to 2000.
Top Dollar Game Advertisement written by IGT, published in 1998.
Totem Pole Advertisement written by IGT, published in 1997.
Treasure Wheel/Treasure Tunnel Advertisement written by Sigma Game, Inc., published prior to 2000.
Wheel of Fortune Advertisement written by IGT, published in 1998.
Wheel Of Fortune Advertisement written by IGT, published in 1999.
Wheel Poker Article written by Strictly Slots (Anchor Games), published in Nov. 2000.
Winning Streak Web Site Description written by WMS Gaming Inc. (web site), printed on Mar. 21, 2001.
X Factor Advertisement and Website Page written by WMS Gaming, Inc., published in 1998.

* cited by examiner

GAMING DEVICE HAVING OFFER AND ACCEPTANCE GAME WITH A PLURALITY OF AWARD POOLS, A REVEAL FEATURE, AND A MODIFY FEATURE

PRIORITY CLAIM

This application claims priority to U.S. Provisional Patent Application, Ser. No. 60/325,706, filed on Sep. 28, 2001, entitled "Gaming Device Having Offer and Acceptance Game with a Plurality of Award Pools, a Reveal Feature, and a Modify Feature."

CROSS-REFERENCE TO RELATED APPLICATIONS

This application is related to the following commonly-owned co-pending patent applications: "GAMING DEVICE HAVING IMPROVED OFFER AND ACCEPTANCE GAME WITH MASKED OFFERS," Ser. No. 10/086,014, "GAMING DEVICE HAVING AN OFFER/ACCEPTANCE GAME WITH MULTI-OFFER SYMBOL," Ser. No. 10/245,387, "GAMING DEVICE HAVING AN OFFER/ACCEPTANCE GAME WHEREIN EACH OFFER IS BASED ON A PLURALITY OF INDEPENDENTLY GENERATED EVENTS," Ser. No. 10/244,134, "GAMING DEVICE HAVING AWARD POSITIONS WITH ASSOCIATED CHARACTERISTICS," Ser. No. 10/657,588, "GAMING DEVICE HAVING AN OFFER AND ACCEPTANCE SELECTION BONUS SCHEME WITH A TERMINATOR AND AN ANTI-TERMINATOR," Ser. No. 10/644,447, "GAMING DEVICE HAVING A DESTINATION PURSUIT BONUS SCHEME WITH ADVANCED AND SETBACK CONDITIONS," Ser. No. 10/660,075, "GAMING DEVICE HAVING MULTIPLE ROUND SCHEME WITH RESIDUAL AWARDS," Ser. No. 10/810,146, "GAMING DEVICE HAVING MECHANICAL INDICATOR WITH A MULTIPLE WIN SECTION," Ser. No. 10/956,222, "GAMING DEVICE HAVING MULTIPLE INTERACTING INDEPENDENTLY OPERABLE WHEELS," Ser. No. 10/953,822, "GAMING DEVICE HAVING OFFER/ACCEPTANCE ADVANCE THRESHOLD AND LIMIT BONUS SCHEME," Ser. No. 10/925,561, "GAMING DEVICE HAVING IMPROVED AWARD OFFER BONUS SCHEME," Ser. No. 10/937,664, "GAMING DEVICE HAVING IMPROVED AWARD OFFER BONUS SCHEME," Ser. No. 10/952,062, "GAMING DEVICE HAVING AN AWARD EXCHANGE BONUS ROUND AND METHOD FOR REVEALING AWARD EXCHANGE POSSIBILITIES," Ser. No. 10/982,518, "GAMING DEVICE HAVING RISK EVALUATION BONUS ROUND," Ser. No. 11/041,801, "GAMING DEVICE HAVING AN IMPROVED OFFER/ACCEPTANCE BONUS SCHEME," Ser. No. 11/194,037, "GAMING DEVICE HAVING AN IMPROVED OFFER/ACCEPTANCE BONUS SCHEME," Ser. No. 11/222,695, "GAMING DEVICE HAVING OFFER ACCEPTANCE GAME WITH TERMINATION LIMIT WHEREIN THE OFFER IS PICKED BY A PLAYER," Ser. No. 11/256,417, "GAMING DEVICE HAVING OFFER AND ACCEPTANCE GAME WITH HIDDEN OFFER," Ser. No. 11/338,961, "GAMING DEVICE HAVING BONUS ROUND WITH A WIN, LOSE OR DRAW OUTCOME," Ser. No. 11/380,844, "GAMING DEVICE HAVING BONUS ROUND WITH A WIN, LOSE OR DRAW OUTCOME," Ser. No. 11/557,855, "GAMING DEVICE HAVING BONUS ROUND WITH A WIN, LOSE OR DRAW OUTCOME," Ser. No. 11/724,920, "GAMING DEVICE HAVING BONUS ROUND WITH A WIN, LOSE OR DRAW OUTCOME," Ser. No. 11/724,925, and "GAMING DEVICE HAVING MULTIPLE ROUND SCHEME WITH RESIDUAL AWARDS," Ser. No. 11/687,359.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and more particularly to a gaming device having an offer and acceptance game with a plurality of award pools, a reveal feature and a modify feature.

Gaming devices, such as slot machines, having primary and secondary or bonus games or schemes are well known. One well known bonus game provides a player with a series of award offers consisting of credits or dollars. The player may either accept each award offer or reject each award offer; however, the player must accept the final award offer. If the player accepts an award offer, the player keeps the award offered to the player. If the player rejects the award offer, the gaming device provides another award offer to the player except if the award offer is the final award offer. The award offers are randomly determined from a series of award offers of differing values.

While this type of bonus game has achieved significant popularity in the gaming industry, after playing the game repeatedly, players may lose interest in the game. Accordingly, there is a need for new gaming devices implementing offer and acceptance bonus schemes.

SUMMARY OF THE INVENTION

The present invention provides a gaming device having an offer and acceptance bonus scheme with a plurality of award pools, a reveal feature and a modify feature. In one embodiment of the present invention, the gaming device provides a plurality of pre-determined pools of awards. Each pool of awards includes a plurality of potential awards. Each pool's plurality of awards includes a pre-determined initial award or offer. When the bonus game is initiated, the gaming device randomly selects a pre-determined pool of awards from the plurality of pre-determined pools of awards. The awards included in the selected pool of awards may or may not be displayed to the player. If the game displays the awards in the selected pool, the player knows all of the potential awards the player may obtain. The gaming device reveals to the player the pre-determined initial award or offer from the selected pool of awards. The gaming device randomly associates the plurality of remaining or alternate awards from the selected pre-determined pool of awards with a plurality of selectable selections. The gaming device enables the player to either accept the revealed initial award or offer or select one of the selectable selections. If the player accepts the initial award or offer, the player obtains the initial award or offer and the bonus game ends. If the player selects one of the selectable selections, the gaming device reveals the alternate award associated with the player selected selection, the player obtains the revealed alternate award and the bonus game ends.

In an alternative embodiment, after the player has obtained or accepted an award, the gaming device reveals the alternate awards associated with the non-selected selections.

In an alternative embodiment of the present invention, the offer and acceptance bonus scheme proceeds without a reveal feature. In this embodiment, after the gaming device randomly selects a pre-determined pool of awards, the gaming device displays the pre-determined initial award or offer and at least one alternate award from the selected pool of awards. The gaming device enables the player to either accept or reject the displayed initial award or offer. If the player accepts the initial award or offer, the player obtains the initial award or offer and the bonus game ends. If the player rejects the initial award or offer, the gaming device selects one of the alternate awards from the selected pool of awards, the player obtains the selected alternate award and the bonus game ends.

In one preferred embodiment of the present invention, after the player has obtained or accepted an award, the gaming device provides the player an opportunity to modify or increase the obtained award. In this embodiment, the gaming device provides a modifier, such as a multiplier of the player's obtained award. The gaming device further provides and displays a plurality of choices. The processor of the gaming device randomly associates the provided modifier with one of the plurality of choices. The gaming device enables the player to pick a choice. If the player's picked choice is associated with the modifier, then the player's obtained award is modified by the modifier associated with the picked choice and the bonus game ends. If the player's picked choice is not associated with the modifier, then the player's award is not modified, the player is provided the player's original obtained award and the bonus game ends.

In an alternative embodiment, the gaming device provides a plurality of modifiers, such as a multiplier of the player's obtained award. To enable the player to obtain a modifier, the gaming device provides and displays a plurality of choices. A modifier is associated with each choice. The gaming device does not initially reveal or display the modifier associated with each choice. The processor of the gaming device randomly picks a choice from the plurality of choices. The gaming device enables the player to pick a choice. If the choice picked by the player matches the choice picked by the processor, then the player's obtained award is modified by the modifier associated with the picked choice and the bonus game ends. If the choice picked by the player does not match the choice picked by the processor, the player's obtained award is not modified, the player retains their original obtained award and the bonus game ends.

In another embodiment adapted to modify or increase the player's original obtained award, the gaming device provides and displays a plurality of modifiers. The processor of the gaming device randomly selects a modifier and the gaming device enables the player to pick a modifier. If the modifier picked by the player matches the modifier picked by the processor, the player's obtained award is modified by the picked modifier and the bonus game ends. If the modifier picked by the player does not match the modifier picked by the processor, the player's obtained award is not modified, the player retains their original obtained award and the bonus game ends. This embodiment provides increased entertainment to the player because it displays to the player the plurality of potential modifiers the player may obtain. A lower probability may be associated with the higher modifiers so the player must risk a higher chance of obtaining a low modifier for a chance of obtaining a higher modifier.

In yet another embodiment, the gaming device provides a plurality of modifiers. The gaming device provides a plurality of choices. The gaming device associates the plurality of modifiers with the plurality of choices. The modifier associated with each choice is not initially displayed to the player. In this embodiment, the gaming device enables the player to pick a choice. The gaming device reveals the modifier associated with the choice picked by the player. The player's obtained award is modified by the modifier associated with the choice picked by the player, the player obtains the modified award and the bonus game ends.

It is therefore an advantage of the present invention to provide a gaming device having an offer and acceptance bonus scheme with a plurality of award pools, a reveal feature and a modify feature.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
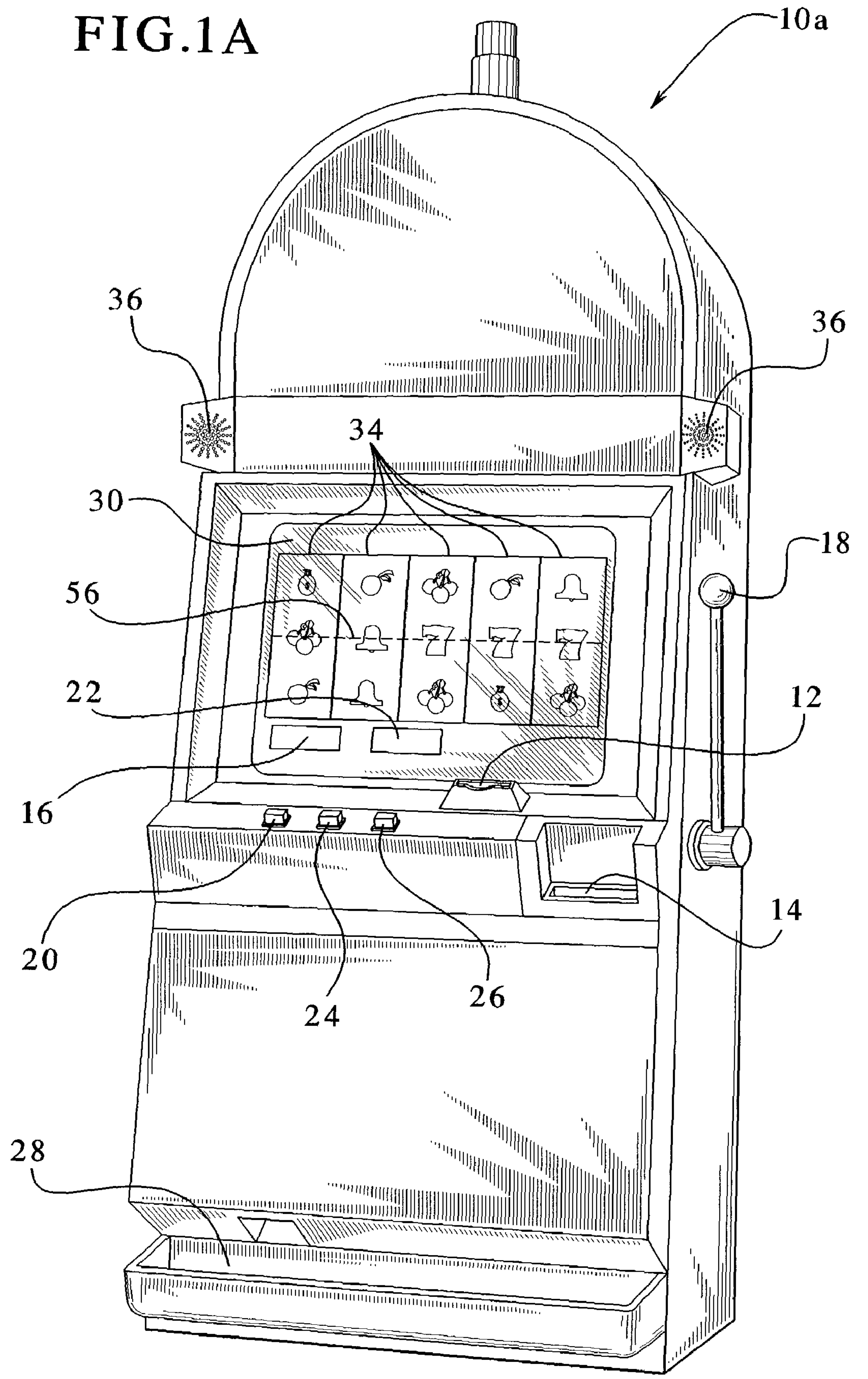
FIGS. 1A and 1B are perspective views of alternative embodiments of the gaming device of the present invention.
Figure 1B:
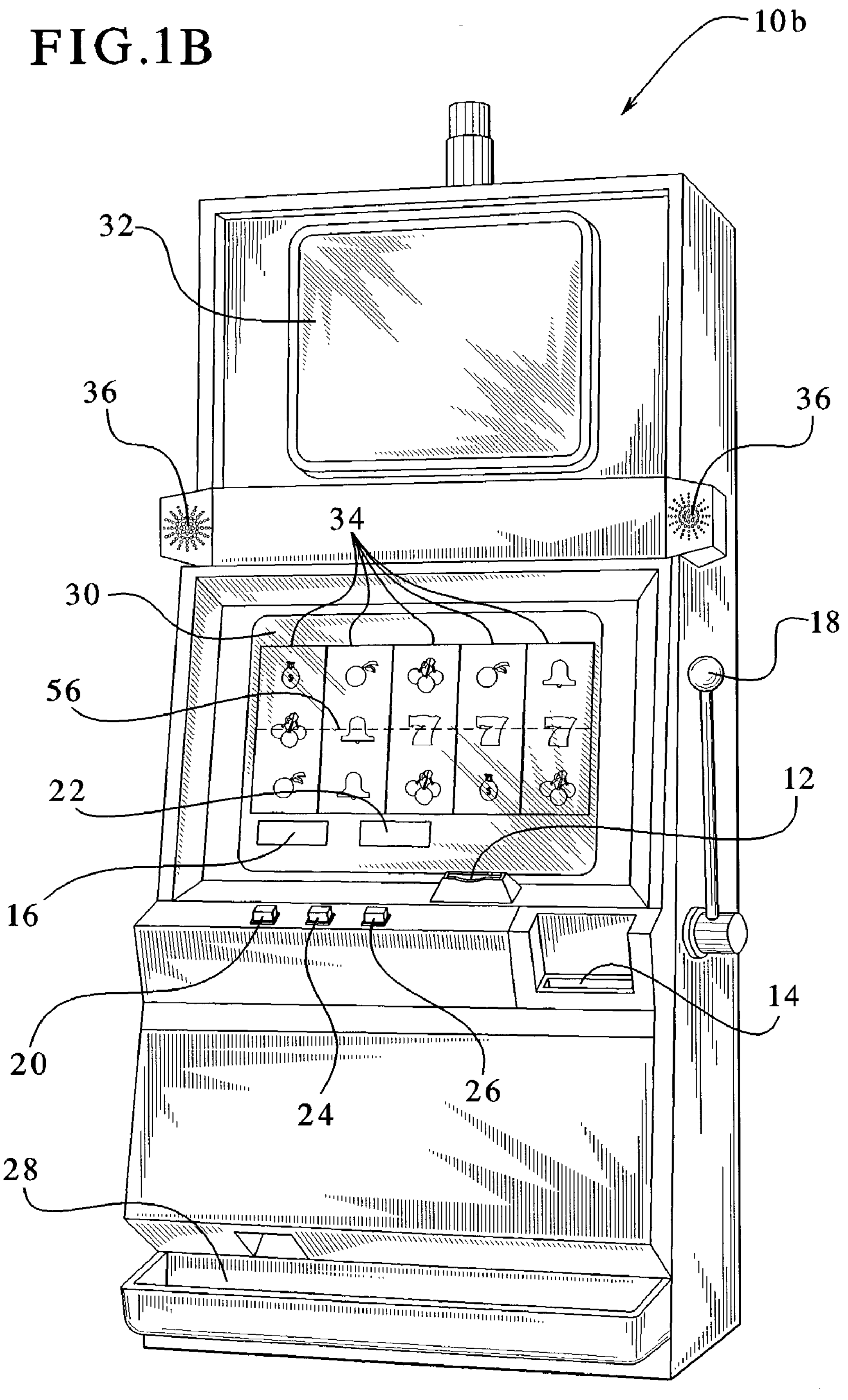

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is in one embodiment a slot machine having the controls, displays and features of a conventional slot machine. It is constructed so that a player can operate it while standing or sitting, and gaming device 10 is preferably mounted on a console or cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of the bonus triggering events and any of the bonus round games related thereto. The symbols and indicia used on and in gaming device 10 may be in mechanical, electronic, electrical or video form.

As illustrated in FIGS. 1A and 1B, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
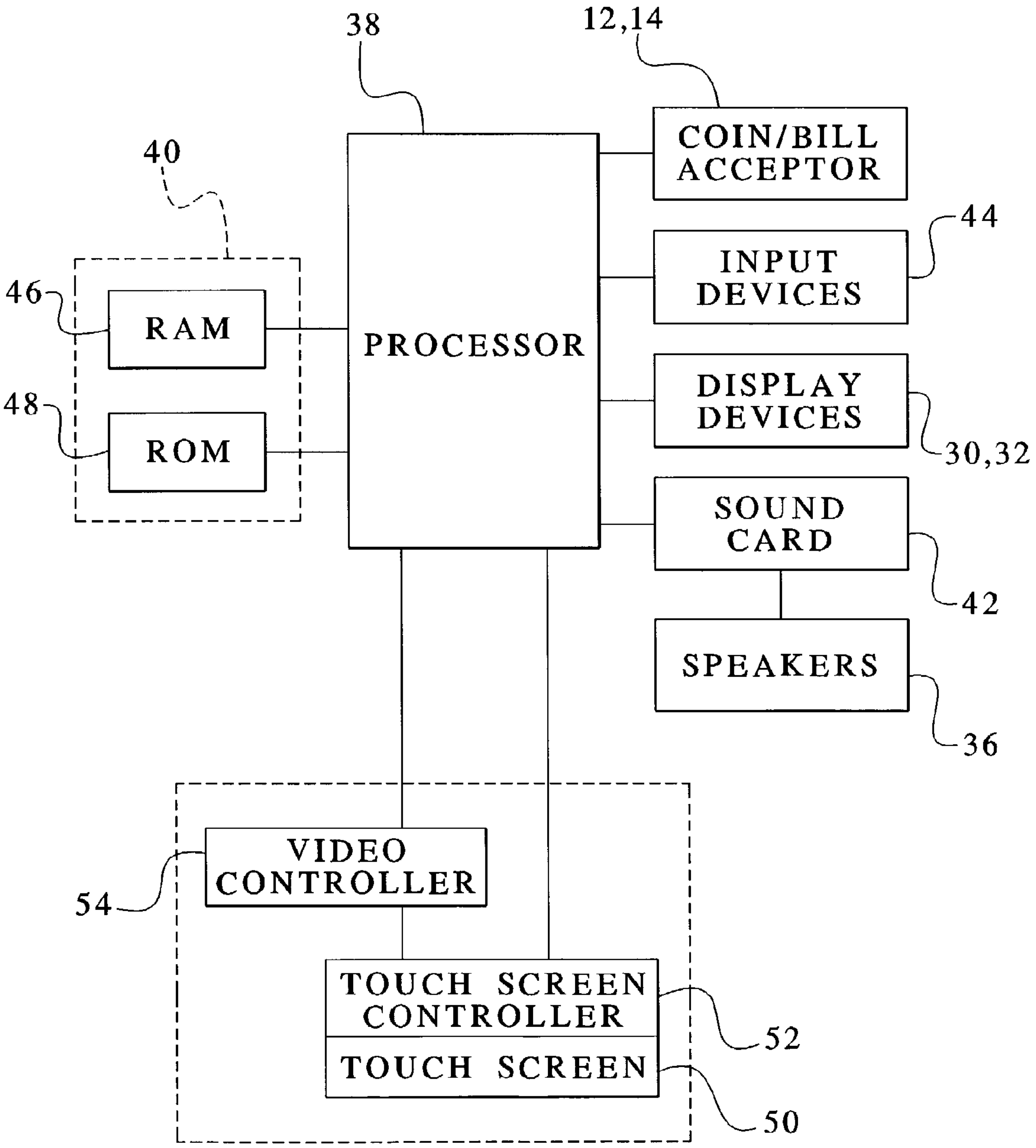
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively and/or individually referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the computer or controller.

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines displayed in a horizontal and/or diagonal fashion.

Bonus Game

One embodiment of the bonus game of the present invention provides a screen or display which enables the player to make a selection to obtain or be offered an award. Each time the bonus game is triggered, the gaming device randomly selects a pre-determined pool of awards from a plurality of predetermined pools of awards. Each predetermined pool of awards includes a plurality of awards. Each pool's plurality of awards includes a pre-determined initial award or offer. In one embodiment, after the gaming device randomly selects a pool of awards, the gaming device could provide a hint to the player, preferably visually or through suitable audio or audio-visual displays, regarding the pool of awards selected. For example, the hint of "OH, THAT WAS NOT VERY GOOD" could be provided to the player if the gaming device selects a pool of awards which have a relatively low value compared to other pools of awards. In one embodiment, all of the values of the awards in the selected pre-determined pool of awards are displayed to the player. Alternatively, none, one, or several of the values of the awards in the selected pool of awards may be displayed to the player.

In one embodiment, the average value of the alternate awards in each pre-determined pool of awards equals the value of each pool's pre-determined initial award or offer. In another embodiment, while the average value of the alternate awards in each pre-determined pool of awards equals the value of each pool's pre-determined initial award or offer, there are an equal number of alternate awards higher and lower than the predetermined initial award or offer. In another embodiment, while the average value of the alternate awards in each pre-determined pool of awards equals the value of each pool's pre-determined initial award or offer, there are more alternate awards of lower value than the predetermined initial award or offer than alternate awards of higher value than the predetermined initial award or offer. In another embodiment, while the average value of the alternate awards in each pre-determined pool of awards equals the value of each pool's pre-determined initial award or offer, there are more alternate awards of higher value than the predetermined initial award or offer than alternate awards of lower value than the predetermined initial award or offer. In another embodiment, the gaming device may weigh the frequency that the gaming device selects each pre-determined pool of awards, so that a pool with higher or higher average award values is selected less frequently than a pool with lower or lower average award values.

After the pre-determined pool of awards is selected, the gaming device reveals to the player the pre-determined initial award or offer from the selected award pool. The gaming device randomly associates the plurality of remaining alternate awards from the selected pool of awards with a plurality of selectable selection. The gaming device does not initially reveal the value of the alternate award, such as a credit or dollar amount, associated with each selectable selections. The gaming device enables the player to either accept the revealed initial award or offer or select one of the selectable selections to obtain an alternate award. It should be appreciated that in the embodiment where the alternate awards from the award pool are revealed to the player, the player may compare the displayed values of the alternate awards from the award pool associated with the selectable selections with the value of the initial award or offer to determine whether to accept the initial award or offer or obtain a new award. This embodiment provides increased entertainment and enjoyment to the player because it enables the player to know the volatility of the range of values between the initial award and the alternate awards. If the player accepts the initial award or offer, the player obtains the initial award or offer and this part of the bonus game ends. If the player selects one of the selectable selections, the gaming device reveals the alternate award associated with the selected selection, the player obtains that alternate award and this part of the bonus game ends. After the player has accepted or obtained an award, in one embodiment, the gaming device reveals the alternate awards associated with the non-selected selections.

In one embodiment of the present invention, the number of alternate awards in each pre-determined pool of awards is equal to the number of selectable selections. In an alternative embodiment of the present invention, the number of alternate awards in each pre-determined pool of awards is greater than the number of selectable selections. In this embodiment, the gaming device randomly selects a plurality of alternate awards from the selected pre-determined pool of awards. It should be appreciated that in this embodiment although the values from the selected pre-determined pool of awards are displayed to the player, not every displayed alternate award will be associated with a selectable selection. This increases the excitement and entertainment to the player because the player does not know if a potential alternate award is associated with a selection. In another embodiment, the number of alternate awards in each pre-determined pool of awards is less than the number of selectable selections. Accordingly, at least one alternate award from the selected pre-determined pool of awards will be associated with a plurality of selectable selections. In an alternative embodiment, the plurality of pre-determined pools of awards includes a combination of award pools with the number of alternate awards in each pool is greater than, less than, or equal to the number of selectable selections.

In an alternative embodiment, the gaming device associates modifiers, such as multipliers of any amount obtained during the primary game with the plurality of selectable selections. In another embodiment, the gaming device associates each selectable selection with an alternate award, a modifier or a combination thereof.

In another embodiment of the present invention, the gaming device provides two pre-determined pools of awards. One pre-determined pool of awards includes awards that will be revealed to the player as initial awards or offers. The other pre-determined pool of awards includes a plurality of alternate awards. In this embodiment, the gaming device randomly selects an initial award or offer from the pool of initial awards or offers and randomly selects a plurality of alternate awards from the other award pool to be associated with the plurality of selectable selections.

Figure 3A:
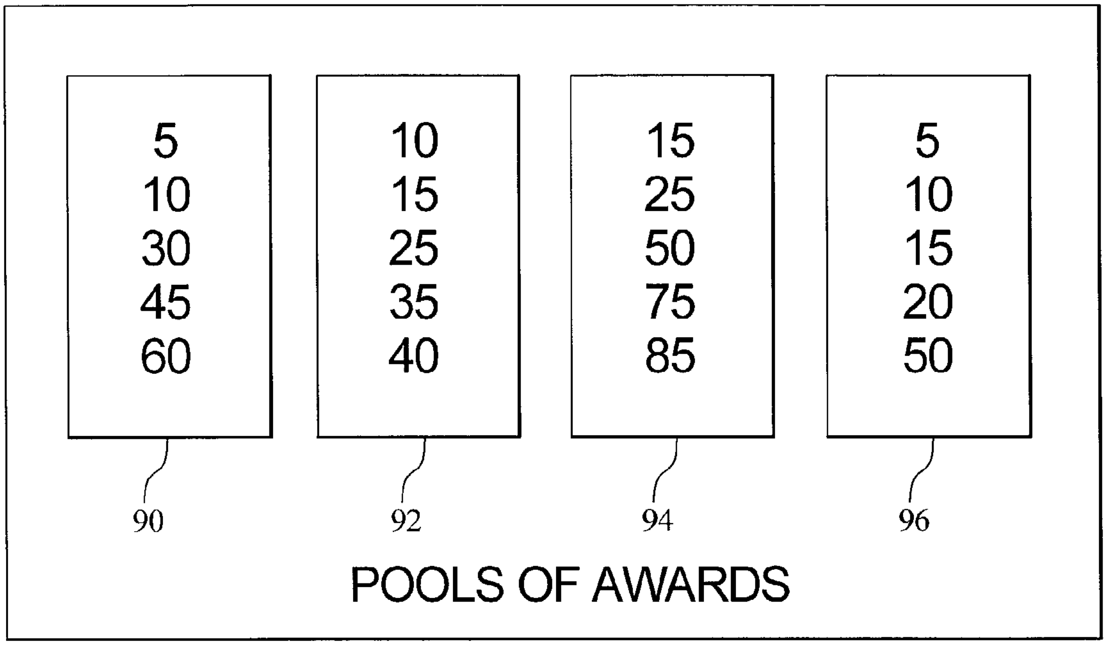
FIGS. 3A, 3B and 3C are tables which illustrate the gaming device selecting a pre-determined pool of awards from a plurality of pre-determined pools of awards.
Figure 3B:
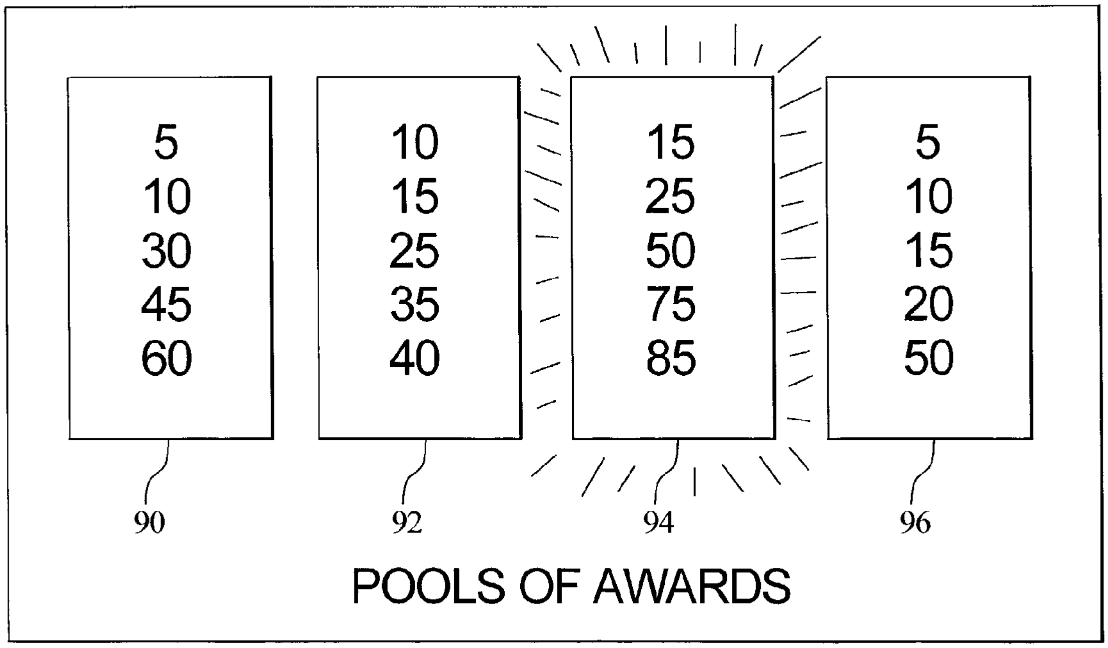
Figure 3C:
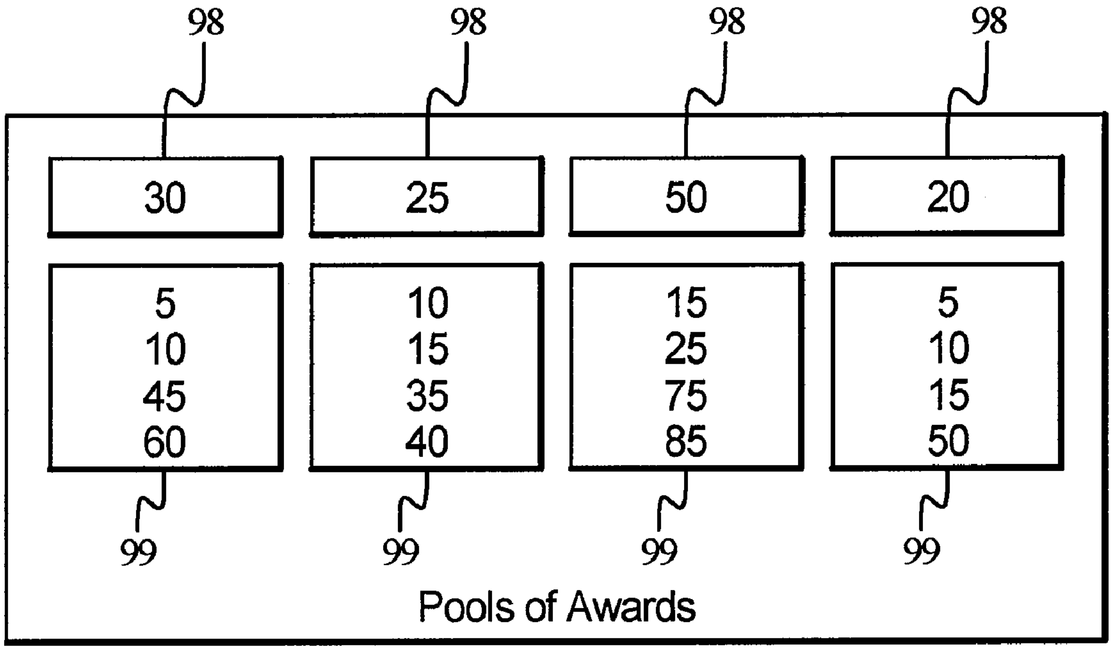

Referring now to FIGS. 3A and 3B, in one example of the present invention, there are four pre-determined pools of awards 90, 92, 94 and 96. Each pre-determined pool of awards includes a pre-determined initial award or offer. Upon the initiation of the bonus game, the gaming device randomly selects one pre-determined pool of awards. As seen in FIG. 3B, the gaming device selected the pre-determined pool of awards 94 with the award values of fifteen, twenty-five, fifty, seventy-five and eighty-five. It should be appreciated that in this pre-determined pool of awards, fifty is the pre-determined initial award or offer. It should be further appreciated that in one embodiment of the present invention, the average of the remaining alternate awards in the pre-determined pool of awards is equal to the pre-determined initial award or offer, in this case fifty. FIG. 3C illustrates the same four pre-determined pools of awards from FIGS. 3A and 3B with the pre-determined initial award or offer 98 from each pool displayed separately from the remaining alternate awards in each pool 99. It should also be appreciated that the random selection of the pre-determined pool of awards is not displayed to the player and is only illustrated for a better understanding of the present invention. It should also be appreciated that the random selection could be made based on differently weighted pools such that certain pools (such as pools with higher values or higher average values) are less likely to be selected than other pools.

Figure 4A:
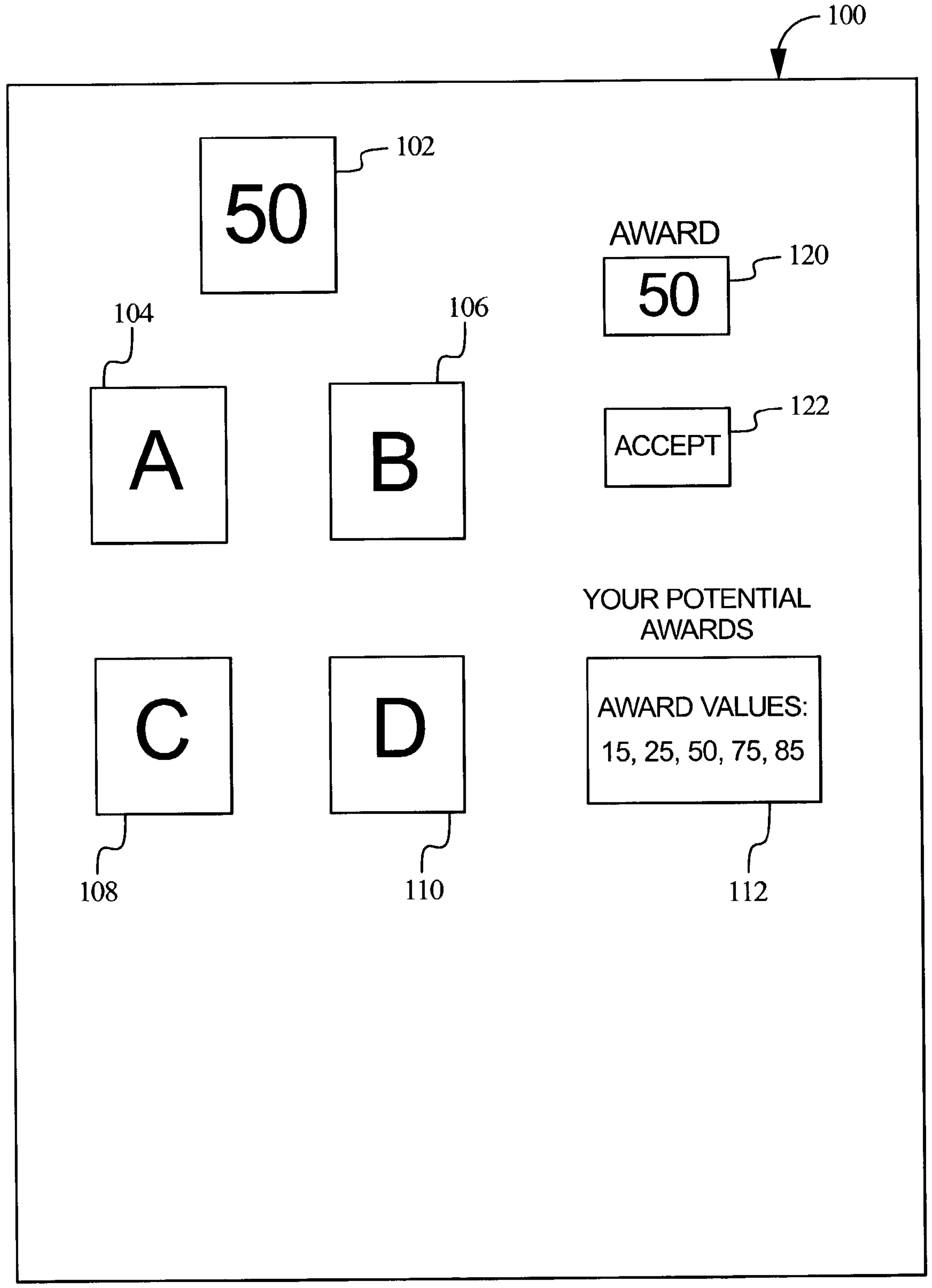
FIGS. 4A through 4D are front elevation views of the award selection screen of one embodiment of the present invention illustrating a player either accepting an initial award or offer or obtaining an award associated with a selectable selection.
Figure 4B:
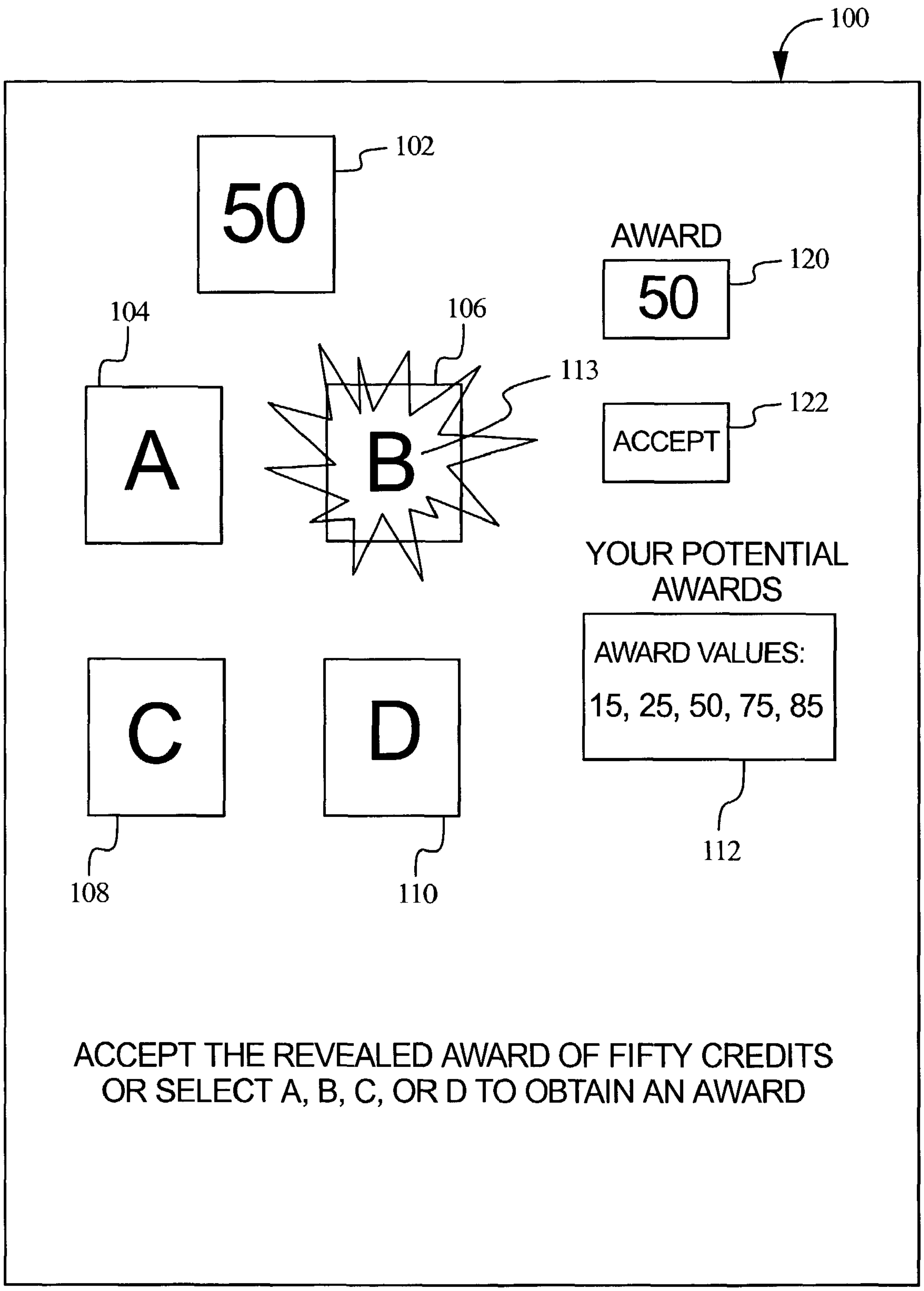
Figure 4C:
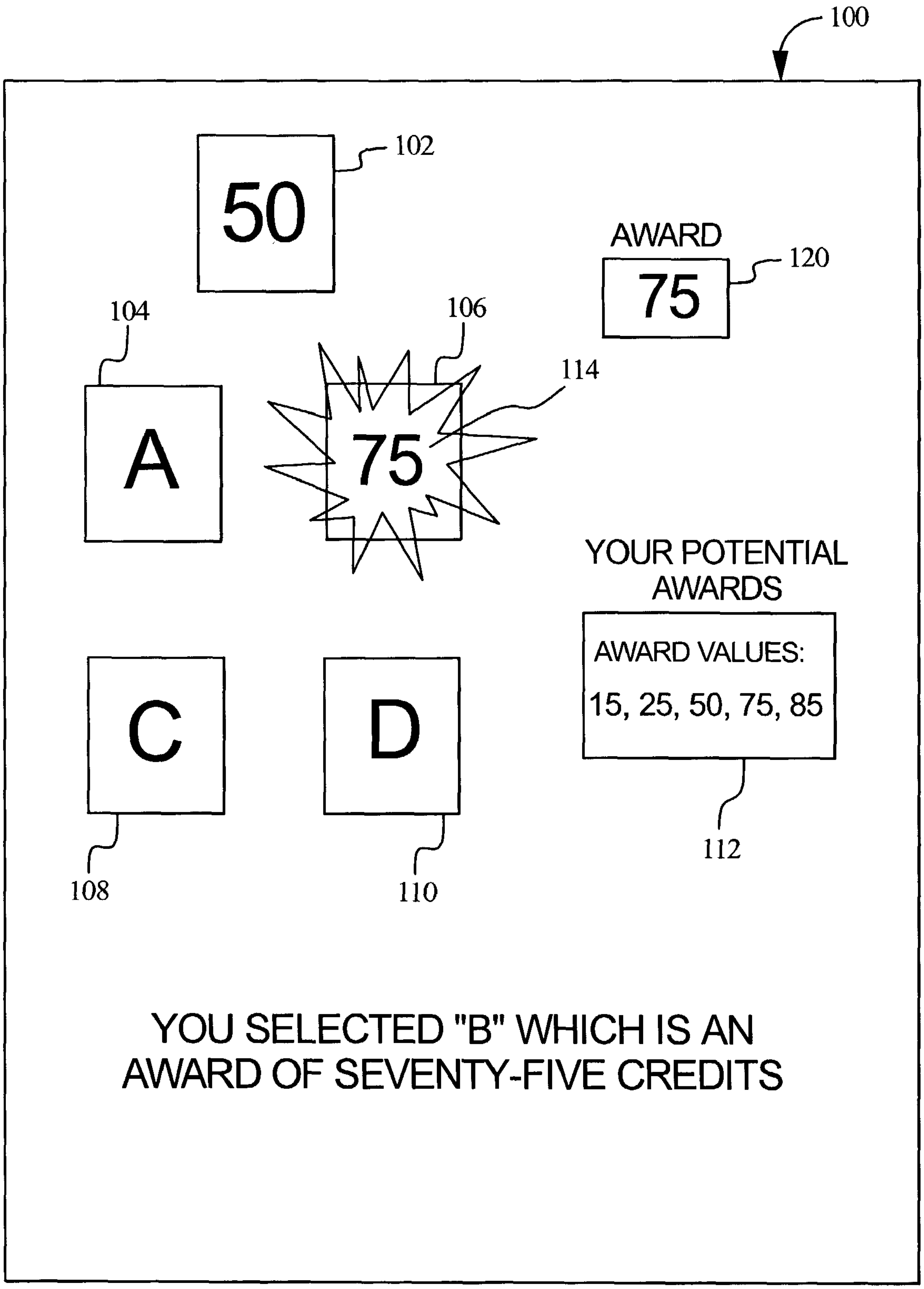
Figure 4D:
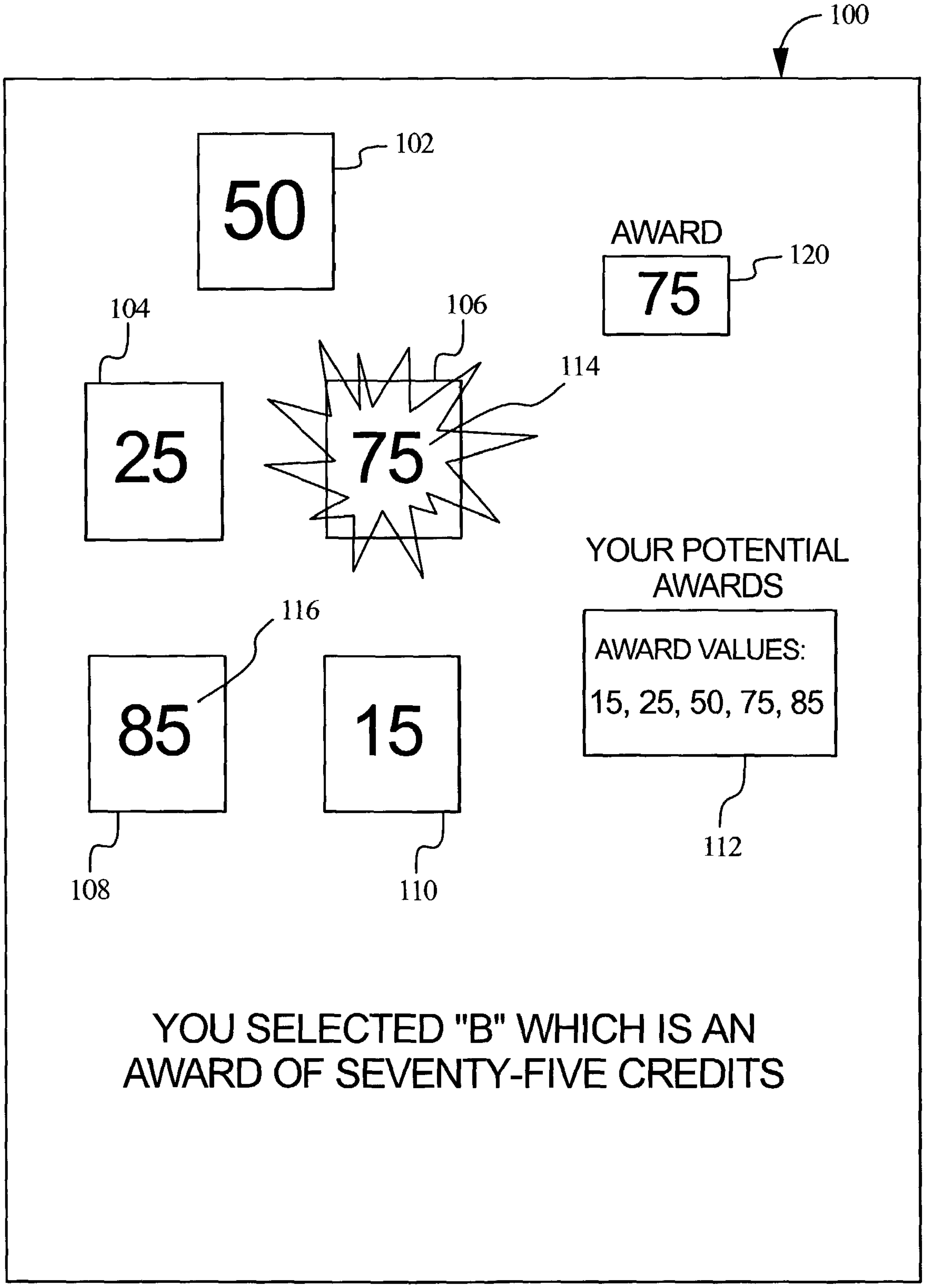

Referring now to FIG. 4A, one example of the present invention provides a screen or display 100 which is preferably a touch screen. In this embodiment, there is an initial award or offer 102 and four selectable selections 104, 106, 108 and 110 labeled A, B, C and D, respectively. The initial award or offer 102 is the pre-determined initial award or offer from the selected pre-determined pool of awards. The initial award or offer of fifty credits 102 is displayed in the award or offer display 120. Each selectable selection is randomly associated with a remaining alternate award from the prior selected pool of awards. The award values of fifteen, twenty-five, fifty, seventy-five and eighty-five included in the prior selected pool of awards are separately displayed to the player 112. It should be appreciated that alternatively zero, one, or more of said alternate award values could be displayed to the player. As illustrated in FIG. 4B, the gaming device enables the player to either accept the initial award or offer 102, or select one of selection A, selection B, selection C or selection D to obtain another award. If, in the embodiment where all of the alternate awards are displayed to the player, after examining the values of the alternate awards associated with the selectable selections, the player is satisfied with the value of the initial award or offer, the player may accept the initial award or offer using the accept award or offer indicator 122. If the player accepts the initial award or offer, the player obtains the initial award or offer and this part of the bonus game ends. If the player decides to obtain a different award, the player selects one of the selectable selections using a selector such as a touch screen which is part of the display device and the gaming device reveals the alternate award associated with the player selected selection. As illustrated in FIG. 4B, the player selected highlighted selection 113 labeled "B", which as revealed in FIG. 4C had an associated alternate award of seventy-five credits 114 which is one of the alternate awards from the pool displayed to the player 112 . The player obtains the alternate award of seventy-five credits 114, the award is displayed in the award or offer display 120 and this part of the bonus game ends. Appropriate messages such as "ACCEPT THE REVEALED AWARD OR SELECT A, B, C OR D TO OBTAIN A NEW AWARD" and "YOU SELECTED B WHICH IS AN AWARD OF SEVENTY-FIVE CREDITS" are preferably provided to the player visually or through suitable audio or audiovisual displays. As illustrated in FIG. 4D, in an additional embodiment of the present invention, after the player either accepts the initial award or obtains an alternate award associated with one of the selectable selections, the gaming device reveals the alternate awards 116 associated with the non-selected selections. Revealing the alternate awards associated with the selections that the player did not pick increases player excitement and enjoyment by showing the player lost opportunities the player could have accepted and the player's relative success or failure in the bonus round.

In an alternative embodiment of the present invention (not shown), after the gaming device randomly selects a pre-determined pool of awards, the gaming device displays the pre-determined initial award or offer and at least one alternate award from the selected pool of awards. The gaming device enables the player to either accept or reject the displayed initial award or offer. If the player accepts the initial award or offer, the player obtains the initial award or offer and the bonus game ends. If the player rejects the initial award or offer, the gaming device selects one of the alternate awards from the selected pool of awards, the player obtains the selected alternate award and the bonus game ends.

In one preferred embodiment of the present invention, after the player has obtained or accepted an award, the gaming device provides the player an opportunity to modify or increase the obtained award. In one embodiment, the gaming device provides a modifier, such as a multiplier of the player's obtained award. The gaming device further provides and displays a plurality of choices. The processor of the gaming device randomly picks a choice and associates the provided modifier with the processor picked choice. The gaming device does not initially reveal or display the choice associated with the modifier. The gaming device enables the player to pick a choice. If the player picked choice matches the processor picked choice, the player's obtained award is modified by the modifier associated with the picked choice and the bonus game ends. If the player picked choice does not match the processor picked choice, the player is awarded their original obtained award and the bonus game ends.

In another embodiment adapted to modify the player's obtained award, the gaming device provides and displays a plurality of modifiers. The processor of the gaming device randomly picks a modifier and the gaming device enables the player to pick a modifier. If the modifier picked by the player matches the modifier picked by the processor, the player's obtained award is modified by the picked modifier and the bonus game ends. If the modifier picked by the player does not match the modifier picked by the processor, the player is awarded their original obtained award and the bonus game ends. It should be appreciated that this embodiment increases the player's entertainment by revealing all the potential modifier's the player may obtain.

It should be further appreciated that in this embodiment there is a lower probability associated with the higher value modifiers and a higher probability associated with the lower value modifiers. In this embodiment, the processor is more likely to pick a lower value modifier (such as a 2× or 3×) than higher value modifier (such as a 4× or 5×). Therefore, if the player picks a lower value modifier, there is more of a chance that the player will obtain the modifier because there is more of a chance that the processor will pick the lower value modifier. If the player picks a higher value modifier, there is less of a chance of the player obtaining the modifier because there is less of a chance of the processor picking the higher value modifier. This adds excitement and enjoyment to this part of the bonus game for the player.

Figure 5A:
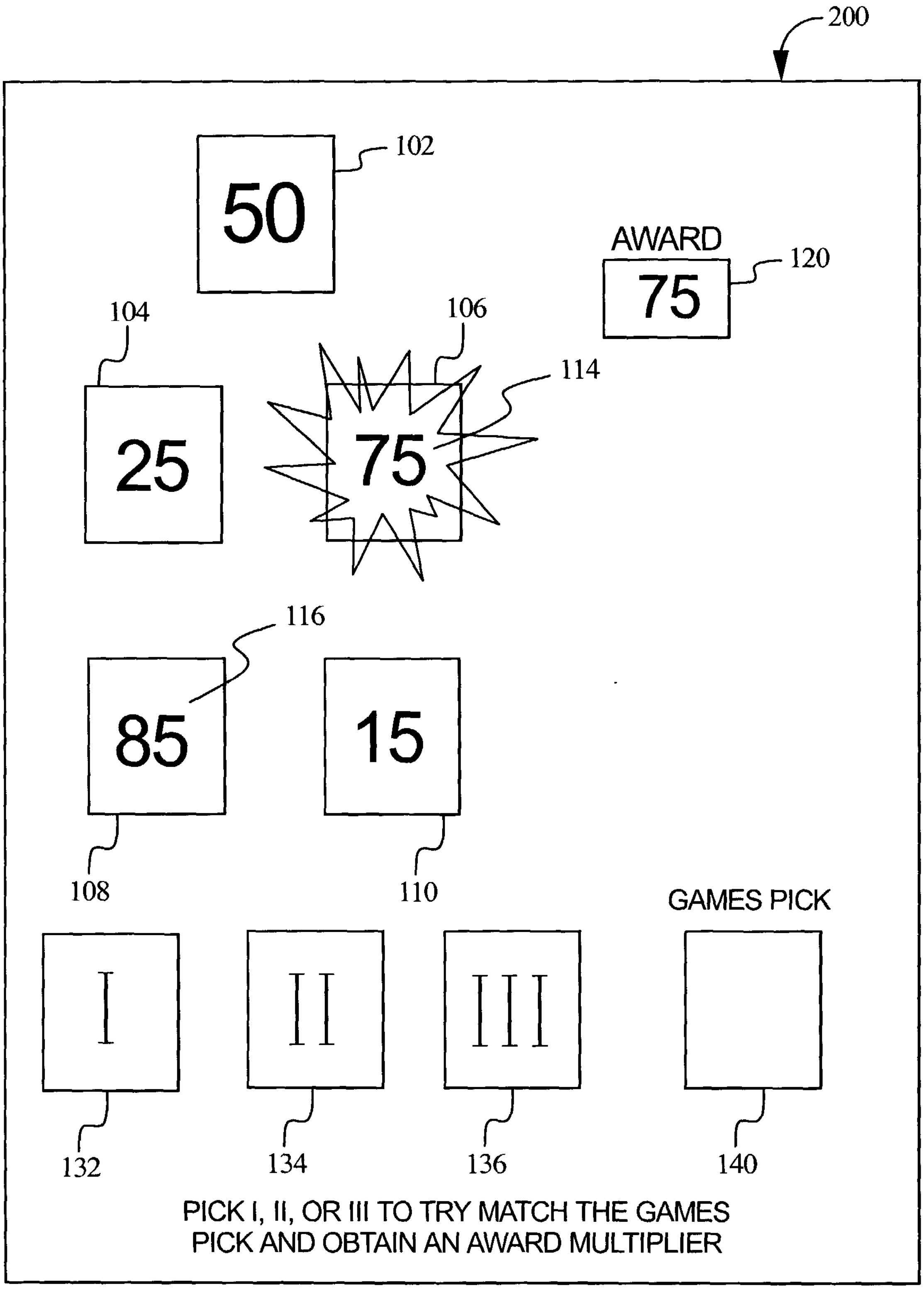
FIGS. 5A through 5D are front elevation views of an award modifier screen of an alternative embodiment of the present invention illustrating the player's obtained award being modified by a picked modifier.
Figure 5B:
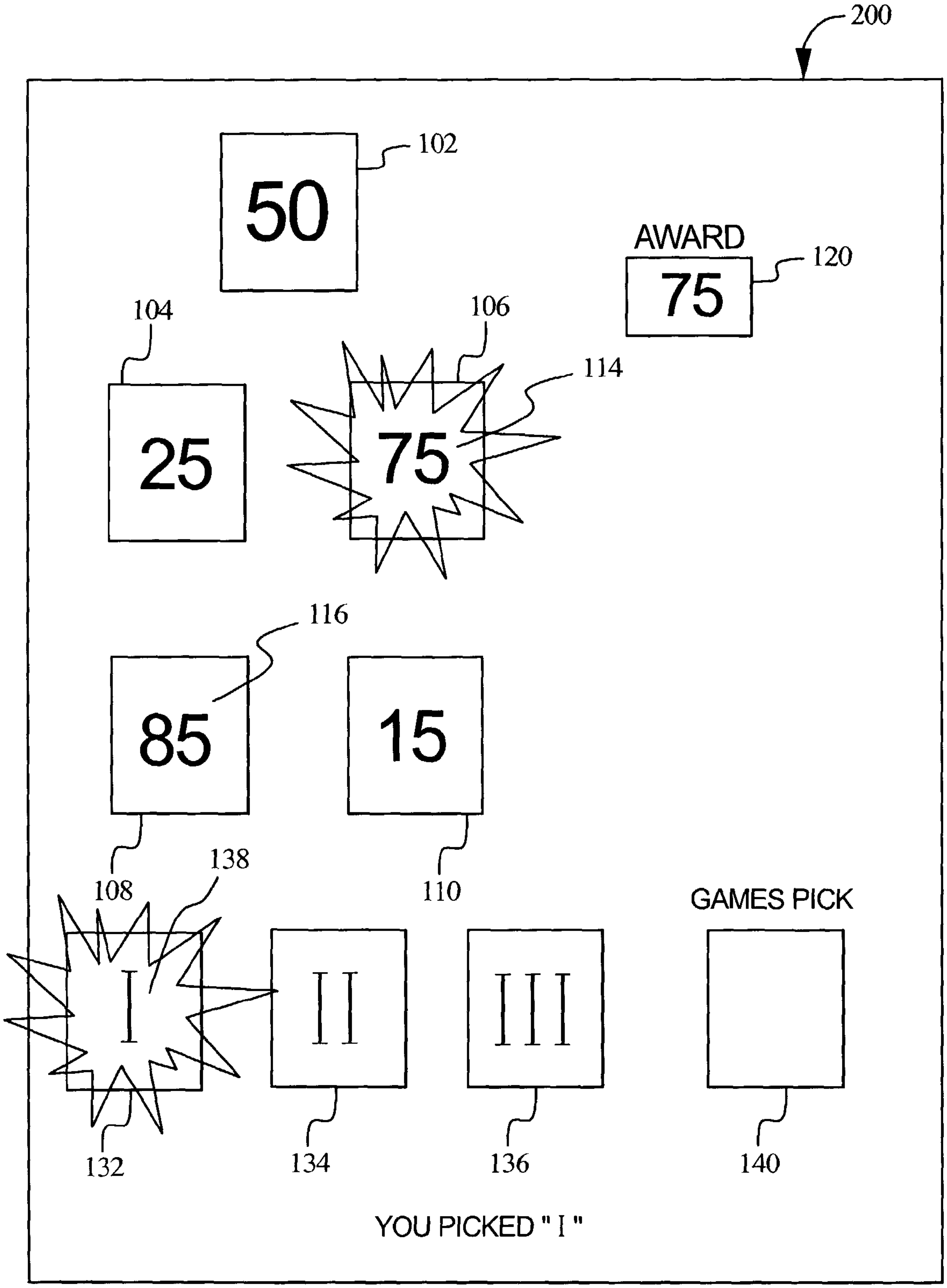
Figure 5C:
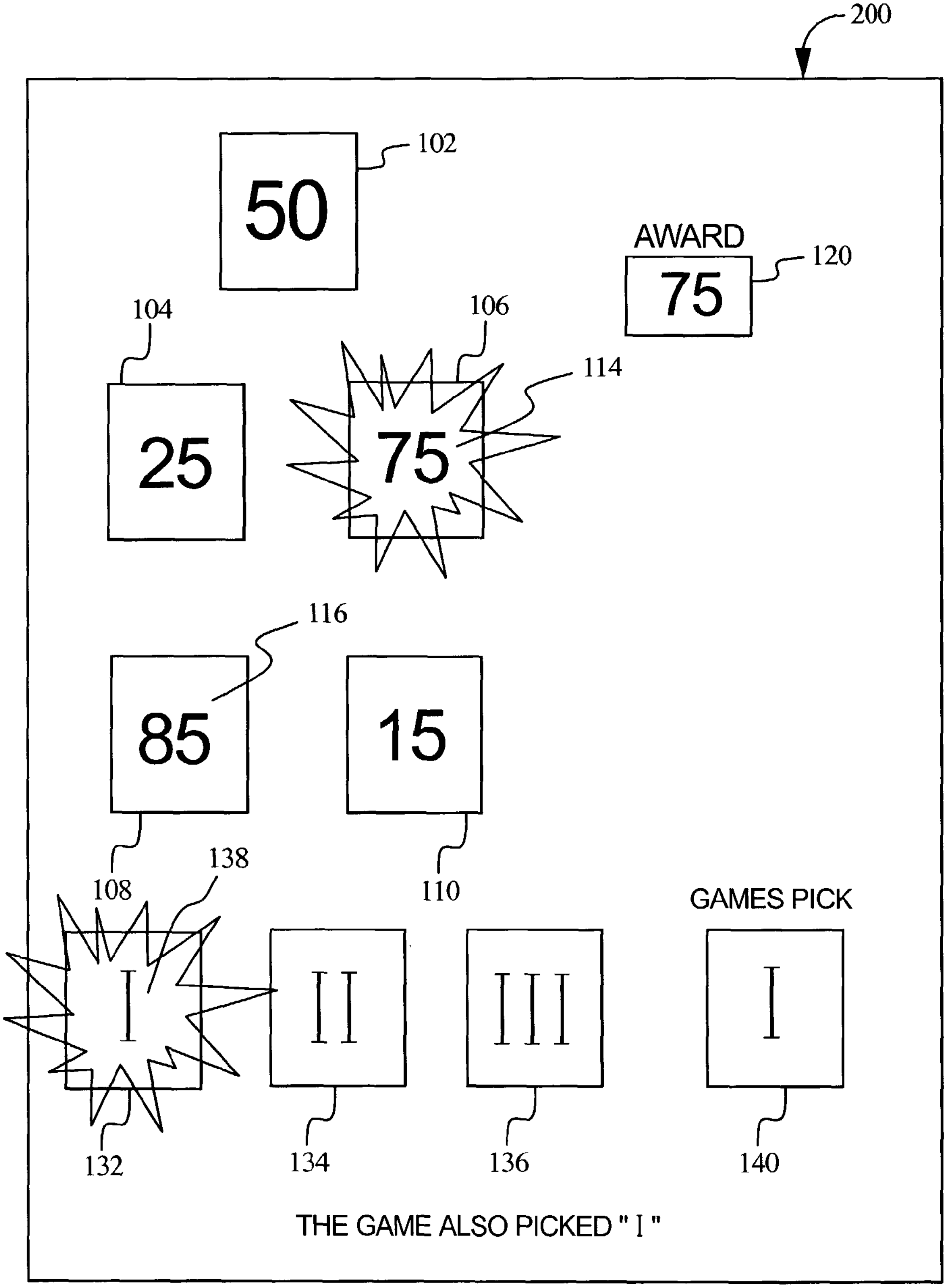
Figure 5D:
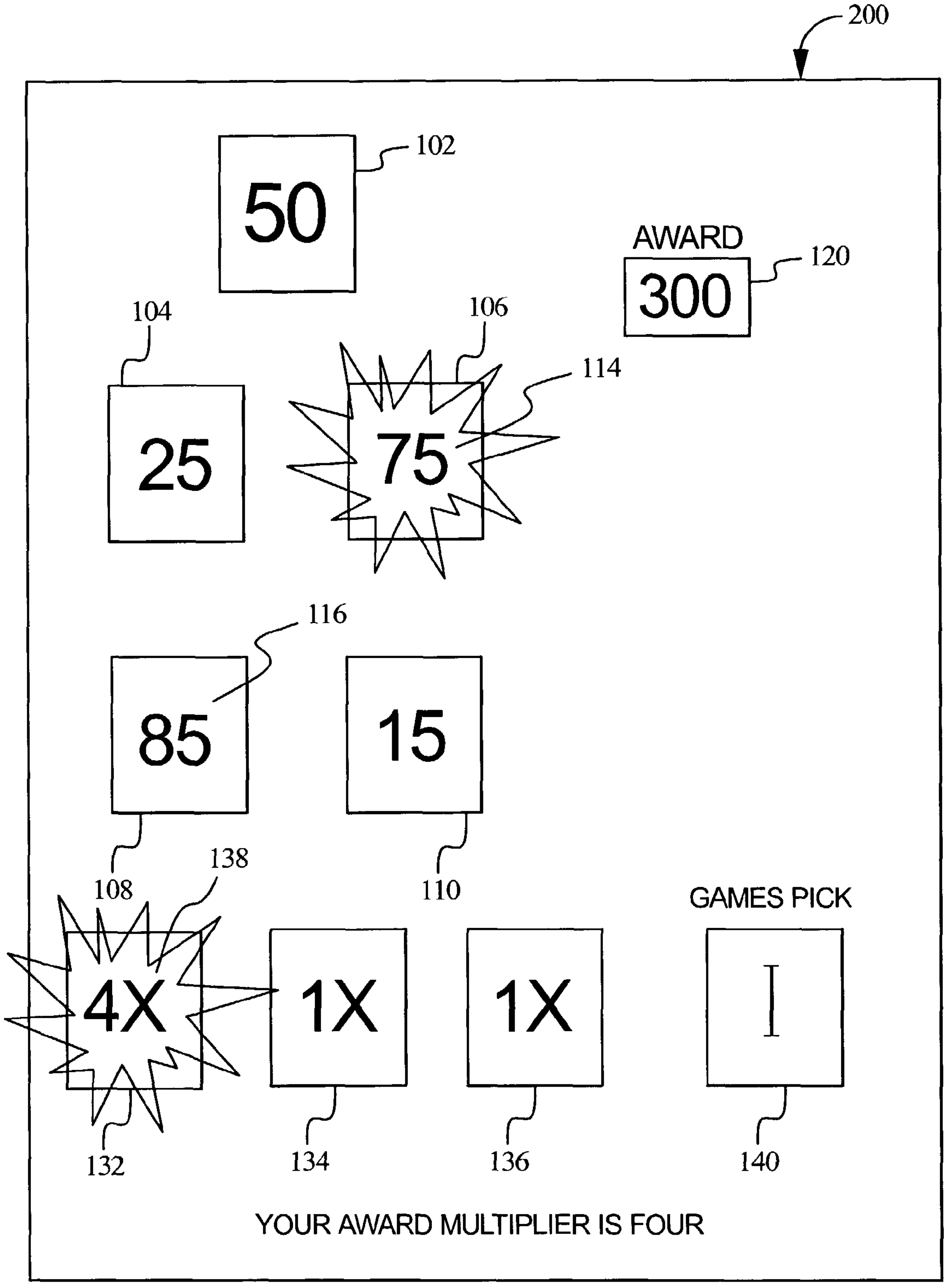

Accordingly, as shown in FIG. 5A, one embodiment of the present invention provides a screen or display 200 which is preferably a touch screen, which enables a player to modify or increase the obtained award. The screen includes the obtained award as described above and additionally provides three choices 132, 134 and 136 labeled I, II and III, respectively. The processor of the gaming device randomly picks either choice I, choice II or choice III. The processor picked choice I. The processor picked choice is associated with a modifier. The gaming device does not initially reveal or display the modifier associated with the processor picked choice. As seen in FIG. 5B, the gaming device enables the player to pick either choice I, choice II or choice III in an attempt to match the processor's picked choice. The player picked choice 132, labeled I, as indicated by the highlighted pick 138 illustrated in FIG. 5B. Accordingly, as shown in FIG. 5C, in the pick display 140 the gaming device reveals the processor's randomly picked choice was also choice I. As illustrated in FIG. 5D, the gaming device reveals the modifier, in this case a multiplier amount of four 142, associated with the matched choice I 132. Accordingly, the award or offer display 120 reveals the player's modified award as three hundred credits, which represents the player's original obtained award of seventy-five credits multiplied by the matched multiplier of four. It should be appreciated that if the player had not picked the same choice as the processor of the gaming device, the player's obtained award would not be modified (or modified by a factor of one), the player would obtain their original obtained award and the bonus game would end. Appropriate messages such as "PICK I, II OR III TO OBTAIN AN AWARD MULTIPLIER," "YOU PICKED I WHICH IS AN AWARD MULTIPLIER OF FOUR" AND "YOUR BONUS AWARD AMOUNT IS 300 CREDITS" are preferably provided to the player visually, or through suitable audio or audiovisual displays. It should be appreciated that the gaming device may reveal a movie/video clip or other animation during the play of the bonus game.

In an alternative embodiment adapted to modify the player's obtained award, the gaming device provides and displays a trivia question. The gaming device also provides and displays a plurality of answers, including the correct answer to the displayed trivia question. The correct answer to the trivia question is preferably associated with a modifier such as a multiplier. The processor of the gaming device enables the player to select which answer the player believes is the correct answer to the displayed trivia question. If the player is correct, the player's obtained award is modified by the associated modifier and the bonus game ends.

While the present invention is described in connection with a gaming device bonus scheme, it should be appreciated that the present invention may be incorporated into a primary game of a gaming device. While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A gaming device comprising:

at least one input device;

at least one display device;

at least one processor; and at least one memory device which stores a plurality of instructions, which when executed by the at least one processor, cause the at least one processor to operate with the at least one input device and the at least one display device, for each of a plurality of plays of a game, to:

(a) maintain plurality of different award pools, each of the plurality of different award pools including a predetermined initial award which is greater than zero and a plurality of separate predetermined alternate awards which are each greater than zero, wherein:

(i) a first of the award pools includes at least one award which is different than any of the awards of a second of the award pools, (ii) the predetermined initial award of one of the award pools is different from each of the separate predetermined alternate awards of that award pool, and (iii) for each of the plurality of different award pools:

(A) said award pool includes a same predetermined initial award for each of the plurality of plays of the game, and (B) said award pool includes a same plurality of predetermined alternate awards for each of the plurality of plays of the game;

(b) randomly select one of the award pools, (c) after selecting one of the award pools, simultaneously display each of said predetermined alternate awards from the selected award pool and the predetermined initial award from the selected award pool, said display including an indication of which of the plurality of displayed awards is the predetermined initial award of the selected award pool, (d) enable a player to accept said indicated predetermined initial award from the selected award pool, (e) if the player accepts the indicated predetermined initial award from the selected award pool, provide the accepted predetermined initial award to the player, and (f) if the player does not accept the indicated predetermined initial award from the selected award pool:

(i) randomly select one of the predetermined alternate awards from the selected award pool, and (ii) provide to the player the randomly selected predetermined alternate award from the selected award pool.

2. The gaming device of claim 1, wherein the instructions cause the at least one processor to randomly select one of the predetermined alternate awards from said selected award pool based on a probability associated with said selected award pool.

3. The gaming device of claim 1, wherein an expected average payout of each of the plurality of different award pools is different for each of the plurality of different award pools.

4. The gaming device of claim 1, wherein a first expected average payout of a first one of the plurality of different award pools is different than a second expected average payout of a second one of the plurality of different award pools.

5. The gaming device of claim 1, wherein an expected average payout of each of the plurality of different award pools is equal.

6. The gaming device of claim 1, wherein at least two expected average payouts of at least two of the plurality of different award pools are equal.

7. The gaming device of claim 1, wherein an average award value of said plurality of separate predetermined alternate awards of each of the award pools is approximately equal to a value of the predetermined initial award for each of said award pools.

8. The gaming device of claim 7, wherein for at least one of the award pools, a first quantity of the plurality of separate predetermined alternate awards which are higher in value than the predetermined initial award is greater than a second quantity of the plurality of separate predetermined alternate awards which are lower in value than the predetermined initial award for said at least one award pool.

9. The gaming device of claim 7, wherein for at least one of the award pools, a first quantity of the plurality of separate predetermined alternate awards which are lower in value than the predetermined initial award is greater than a second quantity of the plurality of separate predetermined alternate awards which are higher in value than the predetermined initial award for said at least one award pool.

10. The gaming device of claim 1, wherein, for at least one of the plurality of plays of the game, the instructions cause the at least one processor to operate with the at least one display device to display at least one of the plurality of separate predetermined alternate awards of the selected award pool at least twice.

11. The gaming device of claim 1, wherein the instructions cause the at least one processor to operate with the at least one display device and at least one touch screen connected to said display device to enable the player to accept the indicated predetermined initial award from the selected award pool.

12. The gaming device of claim 1, wherein, for at least one of the plurality of plays of the game, the instructions cause the at least one processor to select at least two award pools from said plurality of different award pools.

13. The gaming device of claim 12, wherein, for at least one of the plurality of plays of the game, the instructions cause the at least one processor to operate with the at least one display device to display said predetermined initial award from a first one of said at least two selected award pools and to display said plurality of alternate awards from a second one of said at least two selected award pools.

14. A gaming device comprising:

at least one input device;

at least one display device;

at least one processor; and at least one memory device which stores a plurality of instructions, which when executed by the at least one processor, cause the at least one processor to operate with the at least one input device and the at least one display device, for each of a plurality of plays of a game, to:

(a) maintain a plurality of different award pools, each of the plurality of award pools including a predetermined initial award which is greater than zero and a plurality of separate predetermined awards which are each greater than zero, wherein:

(i) a first of the award pools includes at least one award which is different than any of the awards of a second of the award pools, (ii) the predetermined initial award of one of the award pools is different from each of the separate predetermined awards of that award pool, and (iii) for each of the plurality of different award pools:

(A) said award pool includes a same predetermined initial award for each of the plurality of plays of the game, and (B) said award pool includes a same plurality of separate predetermined awards for each of the plurality of plays of the game;

(b) randomly select one of the plurality of award pools;

(c) associate each of a plurality of selections with one of the plurality of separate predetermined awards from the selected award pool;

(d) after selecting one of the plurality of award pools and associating each selection with one of the plurality of separate predetermined awards for the selected award pool, simultaneously display each of said plurality of selections, said plurality of separate predetermined awards from the selected award pool, and the predetermined initial award from the selected award pool, said display including an indication of which of the plurality of displayed awards is the predetermined initial award of the selected award pool;

(e) enable a player to accept said indicated predetermined initial award from the selected award pool;

(f) if the player accepts the indicated predetermined initial award from the selected award pool, provide the accepted predetermined initial award from the selected award pool to the player; and (g) if the player does not accept the indicated predetermined initial award from the selected award pool:

(i) enable the player to select one of said plurality of selections, and (ii) provide to the player any separate predetermined award associated with the selected one of the plurality of selections.

15. The gaming device of claim 14, wherein a quantity of the separate predetermined awards in at least one of the award pools is equal to a quantity of the plurality of selections.

16. The gaming device of claim 14, wherein a quantity of the separate predetermined awards in at least one of the award pools is greater than a quantity of the plurality of selections.

17. The gaming device of claim 14, wherein a quantity of the separate predetermined awards in at least one of the award pools is less than a quantity of the plurality of selections.

18. The gaming device of claim 14, wherein the instructions cause the at least one processor to operate with the at least one display device to reveal the separate predetermined award associated with at least one of any unselected displayed selections after providing either the accepted predetermined initial award from the selected award pool or the separate predetermined award associated with the selected one of the plurality of selections to the player.

19. The gaming device of claim 14, wherein the instructions cause the at least one processor to operate with the at least one display device, for at least one of the plurality of plays of the game, to display the predetermined initial award from a first one of said plurality of award pools and to associate said plurality of separate predetermined awards from a second one of said plurality of award pools with said selections.

20. A gaming device comprising:

at least one input device;

at least one display device;

at least one processor; and at least one memory device which stores a plurality of instructions, which when executed by the at least one processor, cause the at least one processor to operate with the at least one input device and the at least one display device to:

(a) store an award determined in a bonus game;

(b) display a plurality of choices, each of said plurality of choices being associated with one of a plurality of modifiers;

(c) randomly determine a first pick of one of the plurality of choices without displaying any indication of said determined first pick;

(d) enable a player to provide an input indicative of at least one player pick of at least one of said plurality of choices;

(e) compare the randomly determined first pick with the at least one separate player pick; and (f) if the first pick matches the at least one player pick:

(i) display an indication that said first pick matches the at least one player pick, and (ii) modify the award determined in the bonus game based on the modifier associated with the matching first pick and at least one player pick.

21. A gaming device comprising:

at least one input device;

at least one display device;

at least one processor; and at least one memory device which stores a plurality of instructions, which when executed by the at least one processor, cause the at least one processor to operate with the at least one input device and the at least one display device, for each of a plurality of plays of a game, to:

(a) maintain a plurality of different award pools, each award pool including a predetermined initial award which is greater than zero and a plurality of separate predetermined alternate awards which are each greater than zero, wherein:

(i) a first of the award pools includes at least one award which is different than any of the awards of a second of the award pools, (ii) the predetermined initial award of at least one of the award pools is different from each of the separate predetermined alternate awards of that award pool, and (iii) for each of the plurality of different award pools:

(A) said award pool includes a same predetermined initial award for each of the plurality of plays of the game, and (B) said award pool includes a same plurality of predetermined alternate awards for each of the plurality of plays of the game;

(b) randomly select one of the award pools;

(c) after randomly selecting one of the award pools, simultaneously display each of said alternate awards from said selected award pool, said initial award from said selected award pool, and a plurality of choices, at least one of said choices being associated with a modifier, said display including an indication of which of the plurality of displayed awards is the predetermined initial award of the selected award pool;

(d) enable a player to accept said indicated predetermined initial award from the selected award pool;

(e) if the player accepts the indicated predetermined initial award from the selected award pool, provide the accepted predetermined initial award to the player;

(f) if the player does not accept the indicated predetermined initial award from the selected award pool:

(i) randomly select one of the predetermined alternate awards from the selected award pool, and (ii) provide the randomly selected predetermined alternate award from the selected award pool to the player;

(g) randomly select a first one of the plurality of choices without displaying an indication of said selected first one of the plurality of choices;

(h) enable the player to provide an input indicative of a player-picked second one of the plurality of choices;

(i) compare the randomly selected first one of the plurality of choices with the player-picked second one of the plurality of choices; and (j) if the first one of the plurality of choices matches the second one of the plurality of choices:

(i) display an indication that said first one of the plurality of choices matches the second one of the plurality of choices, and (ii) modify any award provided to the player based on any modifier associated with the matching first one of the plurality of choices and the second one of the plurality of choices.

22. A gaming device comprising:

at least one input device;

at least one display device;

at least one processor; and at least one memory device which stores a plurality of instructions, which when executed by the at least one processor, cause the at least one processor to operate with the at least one input device and the at least one display device, for each of a plurality of plays of a game, to:

(a) maintain a plurality of different award pools, each award pool including a predetermined initial award which is greater than zero and a plurality of separate predetermined awards which are each greater than zero, wherein:

(i) a first of the award pools includes at least one award which is different than any of the awards of a second of the award pools, (ii) the predetermined initial award of at least one of the award pools is different from each of the separate predetermined awards of said award pool, and (iii) for each of the plurality of different award pools:

(A) said award pool includes a same predetermined initial award for each of the plurality of plays of the game, and (B) said award pool includes a same plurality of separate predetermined awards for each of the plurality of plays of the game;

(b) randomly select one of the award pools;

(c) after randomly selecting one of the award pools, simultaneously display the initial award from the selected award pool, the plurality of separate predetermined awards from the selected award pool, a plurality of selections which are each associated with one of the plurality of separate predetermined awards, and a plurality of choices, at least one of said choices being associated with at least one modifier, said display including an indication of which of the plurality of displayed awards is the predetermined initial award of the selected award pool;

(d) enable a player to accept said indicated predetermined initial award from the selected award pool;

(e) if the player accepts the indicated predetermined initial award from the selected award pool, provide the accepted predetermined initial award to the player;

(f) if the player does not accept the indicated predetermined initial award from the selected award pool:

(i) enable the player to select one of said selections, and (ii) provide to the player the separate predetermined award associated with the selected one of the selections;

(g) randomly select a first one of the plurality of choices without displaying an indication of said selected first one of the plurality of choices;

(h) enable the player provide an input indicative of a player-picked second one of the plurality of choices;

(i) compare the randomly selected first one of the plurality of choices with the player-picked second one of the plurality of choices, and (j) if the first one of the plurality of choices matches the second one of the plurality of choices:

(i) display an indication that said first one of the plurality of choices matches the second one of the plurality of choices, and (ii) modify any award provided to the player based on any modifier associated with the matching first one of the plurality of choices and the second one of the plurality of choices.

23. A method of operating a gaming device, said method comprising the steps of:

(a) triggering a bonus round;

(b) providing a plurality of different award pools, each of the plurality of different award pools including a predetermined initial award which is greater than zero and a plurality of separate predetermined alternate awards which are each greater than zero, wherein:

(i) a first of the award pools includes at least one award which is different than any of the awards of a second of the award pools, (ii) the predetermined initial award of one of the award pools is different from each of the separate predetermined alternate awards of that award pool, and (iii) for each of the plurality of different award pools:

(A) said award pool includes a same predetermined initial award for each of a plurality of triggers of the bonus round, and (B) said award pool includes a same plurality of predetermined alternate awards for each of the plurality of triggers of the bonus round;

(c) randomly selecting one of the plurality of different award pools;

(d) after randomly selecting one of the plurality of different award pools, causing at least one display device to simultaneously display the initial award and each of the predetermined alternate awards from said selected award pool, said display including an indication o which of the plurality of displayed awards is the predetermined initial award of the selected award pool;

(e) enabling a player to accept said indicated predetermined initial award from the selected award pool;

(f) providing the indicated predetermined initial award from the selected award pool if the player accepts said indicated predetermined initial award from the selected award pool; and (g) if the player does not accept the indicated predetermined initial award from the selected award pool:

(i) randomly selecting one of the predetermined alternate awards from said selected award pool, and (ii) providing the player the selected alternate award from the selected award pool.

24. A method of operating a gaming device, said method comprising the steps of:

(a) triggering a bonus round;

(b) providing a plurality of different award pools, each of the plurality of different- award pools including a predetermined initial award which is greater than zero and a plurality of separate predetermined alternate awards which are each greater than zero, wherein:

(i) a first of the award pools includes at least one award which is different than any of the awards of a second of the award pools, (ii) the predetermined initial award of one of the award pools is different from each of the separate predetermined alternate awards of that award pool, and (iii) for each of a plurality of different award pools:

(A) said award pool includes a same predetermined initial award for each of a plurality of triggers of the bonus round, and (B) said award pool includes a same plurality of predetermined alternate awards for each of the plurality of triggers of the bonus round;

(c) randomly selecting one of the plurality of different award pools;

(d) after randomly selecting one of the plurality of different award pools, causing at least one display device to simultaneously display the initial award and each of the predetermined alternate awards from said selected award pool, said display including an indication of which of the plurality of displayed awards is the predetermined initial award;

(e) associating a plurality of said separate predetermined alternate awards from the selected award pool with a plurality of selections;

(f) enabling a player to either accept said indicated predetermined initial award from the selected award pool or select one of the selections;

(g) providing the indicated predetermined initial award from the selected award pool if the player accepts said indicated predetermined initial award from the selected award pool; and (h) providing any predetermined alternate award associated with the selection selected by the player if the player selects one of said selections.

25. The method of claim 24, which includes, if the player selects one of said selections, revealing the predetermined alternate award associated with the selection selected by the player and any predetermined alternate award associated with at least one of the selections not selected by the player.

26. A method of operating a gaming device, said method comprising the steps of:

(a) triggering a bonus round;

(b) providing a plurality of different award pools, each of the plurality of different award pools including a predetermined initial award which is greater than zero and a plurality of separate predetermined alternate awards which are each greater than zero, wherein:

(i) a first of the award pools includes at least one award which is different than any of the awards of a second of the award pools, (ii) the predetermined initial award of one of the award pools is different from each of the separate predetermined alternate awards of that award pool, and (iii) for each of a plurality of different award pools:

(A) said award pool includes a same predetermined initial award for each of a plurality of triggers of the bonus round, and (B) said award pool includes a same plurality of predetermined alternate awards for each of the plurality of triggers of the bonus round;

(c) randomly selecting one of the different award pools;

(d) after randomly selecting one of the different award pools, causing at least one display device to simultaneously display the predetermined initial award and each of the predetermined alternate awards from said selected award pool, said display including an indication of which of the plurality of displayed awards is the predetermined initial award of the selected award pool;

(e) enabling a player to accept said indicated predetermined initial award from said selected award pool;

(f) providing the indicated predetermined initial award from said selected award pool if the player accepts said indicated predetermined initial award;

(g) if the player does not accept said indicated predetermined initial award from said selected award pool:

(i) randomly selecting one of the predetermined alternate awards from said selected award pool, and (ii) providing any selected predetermined alternate award to the player;

(h) displaying a plurality of choices;

(i) randomly associating a modifier with a first one of said plurality of choices without displaying an indication of which of the plurality of choices is associated with said modifier;

(j) enabling the player to provide an input indicative of a player-picked second one of said plurality of choices;

(k) comparing the first one of the plurality of choices with the player-picked second one of the plurality of choices; and (l) if the first one of the plurality of choices matches the second one of the plurality of choices:

(i) displaying an indication that said first one of the plurality of choices matches the second one of the plurality of choices, and (ii) modifying any award provided to the player based on the modifier associated with the matching first one of the plurality of choices and the second one of the plurality of choices.

27. A method of operating a gaming device, said method comprising the steps of:

(a) triggering a bonus round;

(b) providing a plurality of different award pools, each of the plurality of different award pools including a predetermined initial award which is greater than zero and a plurality of separate predetermined alternate awards which are each greater than zero, wherein:

(i) a first of the award pools includes at least one award which is different than any of the awards of a second of the award pools, (ii) the predetermined initial award of one of the award pools is different from each of the separate predetermined alternate awards of that award pool, and (iii) for each of a plurality of different award pools:

(A) said award pool includes a same predetermined initial award for each of a plurality of triggers of the bonus round, and (B) said award pool includes a same plurality of predetermined alternate awards for each of the plurality of triggers of the bonus round;

(c) randomly selecting one of the plurality of different award pools;

(d) after randomly selecting one of the plurality of different award pools, causing at least one display device to simultaneously display the predetermined initial award and each of the predetermined alternate awards from said selected award pool, said display including an indication of which of the plurality of displayed awards is the predetermined initial award of the selected award pool;

(e) associating said plurality of predetermined alternate awards from said selected award pool with a plurality of selections;

(f) enabling a player to either accept said indicated predetermined initial award from said selected award pool or to select one of the selections;

(g) providing the indicated predetermined initial award from the selected award pool to the player if the player accepts said indicated predetermined initial award;

(h) if the player selects one of the selections:

(i) revealing the alternate award associated with the selection selected by the player, and (ii) providing the revealed alternate award from the selected award pool to the player;

(i) displaying a plurality of choices;

(j) randomly associating a modifier with a first one of said plurality of choices without displaying an indication of which of the plurality of choices is associated with the modifier;

(k) enabling the player to provide an input indicative of a player-picked second one of said plurality of choices;

(l) comparing the first one of the plurality of choices with the player-picked second one of the plurality of choices; and (m) if the first one of the plurality of choices matches the second one of the plurality of choices:

(i) displaying an indication that said first one of the plurality of choices matches the second one of the plurality of choices, and (ii) modifying any award provided to the player based on the modifier associated with the matching first one of the plurality of choices and the second one of the plurality of choices.

28. The method of claim 27, which includes, if the player selects one of said selections, revealing at least one of the plurality of different alternate awards from the selected award pool which is associated with at least one of any of the selections not selected by the player.

* * * * *

UNITED STATES PATENT AND TRADEMARK OFFICE

CERTIFICATE OF CORRECTION

PATENT NO. : 7,901,287 B2
APPLICATION NO. : 10/255862
DATED : March 8, 2011
INVENTOR(S) : Simms et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1324 days.

Signed and Sealed this
Seventh Day of June, 2011

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,901,287 B2
APPLICATION NO. : 10/255862
DATED : March 8, 2011
INVENTOR(S) : Simms et al.

It is certified that error appears in the above-identified patent and that said Letters Patent is hereby corrected as shown below:

In the Claims:

In Claim 23, Column 17, Line 13, replace “o which” with --of which--.

In Claim 24, Column 17, Line 32, replace “different- award” with --different award--.

Signed and Sealed this
Fourteenth Day of June, 2011

David J. Kappos
*Director of the United States Patent and Trademark Office*